(12) United States Patent
Griffioen

(10) Patent No.: US 12,034,283 B2
(45) Date of Patent: Jul. 9, 2024

(54) INTRODUCING AN ELONGATED ELEMENT INTO A SUBMARINE DUCT

(71) Applicant: PLUMETTAZ HOLDING SA, Bex (CH)

(72) Inventor: Willem Griffioen, Ter Aar (NL)

(73) Assignee: PLUMETTAZ HOLDING SA, Bex (CH)

( * ) Notice: Subject to any disclaimer, the term of this patent is extended or adjusted under 35 U.S.C. 154(b) by 339 days.

(21) Appl. No.: 17/766,124

(22) PCT Filed: Sep. 28, 2020

(86) PCT No.: PCT/EP2020/077091
§ 371 (c)(1),
(2) Date: Apr. 1, 2022

(87) PCT Pub. No.: WO2021/063881
PCT Pub. Date: Apr. 8, 2021

(65) Prior Publication Data
US 2022/0344916 A1    Oct. 27, 2022

(30) Foreign Application Priority Data

Oct. 4, 2019 (CH) .................................... 01264/19
Nov. 8, 2019 (CH) .................................... 01410/19

(51) Int. Cl.
*H02G 1/08* (2006.01)
*G02B 6/50* (2006.01)
(Continued)

(52) U.S. Cl.
CPC ............. *H02G 1/086* (2013.01); *G02B 6/506* (2013.01); *G02B 6/52* (2013.01); *H02G 1/10* (2013.01)

(58) Field of Classification Search
CPC .. H02G 1/00; H02G 1/02; H02G 1/04; H02G 1/06; H02G 1/08–10; H02G 9/02;
(Continued)

(56) References Cited

U.S. PATENT DOCUMENTS 5,205,542 A * 4/1993 Keeble ..................... G02B 6/52
                                                     254/134.4
6,536,463 B1 * 3/2003 Beals ........................ F16L 7/00
                                                       405/184
(Continued)

FOREIGN PATENT DOCUMENTS

JP          S5577126 A      6/1980
JP          S61219903 A     9/1986
WO          2021063881 A1   4/2021

OTHER PUBLICATIONS

Foreign Communication from a Related Counterpart Application, International Search Report and Written Opinion dated Dec. 16, 2020, International Application No. PCT/EP2020/077091 filed on Sep. 28, 2020.
(Continued)

*Primary Examiner* — Tyrone V Hall, Jr.
(74) *Attorney, Agent, or Firm* — Conley Rose P.C.

(57) ABSTRACT

Method for installing an elongated element, in a submarine duct, the submarine duct having an entry port and an exit port located in outer liquid (OL) at a second depth,
the method comprising the steps of:
  introducing the elongated element into the entry port,
  introducing propelling liquid (PL) into the entry port,
characterized in that the method comprises a step of sucking propelling liquid (PL) out of the exit port of the duct with an immerged suction pump being operated at a predetermined suction pressure drop ($\Delta P_{pump}$) of propelling liquid (PL) so that the predetermined suction pressure drop ($\Delta P_{pump}$)
(Continued)

applied to propelling liquid (PL) is smaller than a hydrostatic pressure ($P_{hydro}$) of the outer liquid (OL) at the second depth.

13 Claims, 3 Drawing Sheets

(51) Int. Cl.
    *G02B 6/52* (2006.01)
    *H02G 1/10* (2006.01)
(58) Field of Classification Search
    CPC ............ H02G 9/04; H02G 9/06; H02G 9/065;
                   H02G 9/08; H02G 9/00; G02B 6/506;
                                                G02B 6/52
    See application file for complete search history.

(56) References Cited

U.S. PATENT DOCUMENTS

| | | |
|---|---|---|
| 2006/0219992 A1 | 10/2006 | Fee et al. |
| 2017/0110859 A1* | 4/2017 | Gjerull ................... H02G 1/10 |
| 2019/0165554 A1 | 5/2019 | Griffioen |

OTHER PUBLICATIONS

Foreign Communication from a Related Counterpart Application, Swiss Search Report dated Dec. 19, 2019, Swiss Application No. 01264/19 filed on Oct. 4, 2019.

* cited by examiner

INTRODUCING AN ELONGATED ELEMENT INTO A SUBMARINE DUCT

CROSS-REFERENCE TO RELATED APPLICATIONS

The present application is a filing under 35 U.S.C. 371 as the National Stage of International Application No. PCT/EP2020/077091, filed Sep. 28, 2020, entitled "INTRODUCING AN ELONGATED ELEMENT INTO A SUBMARINE DUCT," which claims priority to Swiss Application No. 01410/19 filed with the Intellectual Property Office of Switzerland on Nov. 8, 2019 and Swiss Application No. 01264/19 filed with the Intellectual Property Office of Switzerland on Oct. 4, 2019, all of which are incorporated herein by reference in their entirety for all purposes.

The present invention relates to laying an elongated element (a cable, a fibre, . . . ) into a duct (a tube) which is at least partly immersed. In particular, the invention typically relates to laying an elongated element into a duct which has an entry port located at a first level, e.g. above or at surface level of a lake or sea or at a first depth, a first portion going down (but not limited to that), e.g. to the lake bed or sea bed, and a second portion laying onto the lake bed or sea bed or at a second depth, usually lower than the first depth (but not limited to that). In other words, the elongated element has e.g. to be laid from surface and has to reach a portion of the duct which is laying on lake bed, river bed or sea bed. Consequently, the elongated element may be laid from surface to the second portion of duct located at a depth of tens of meters, hundreds of meters, and even thousands of meters.

Known methods to install elongated elements into ducts make use of a propelling fluid, to generate drag forces along all the length of the elongated element. It is known to introduce the propelling fluid into the duct under pressure via a pressure chamber connected to the entry of the duct. Then, the elongated element has to be pushed into the pressure chamber to enter the duct. However, the pressure to be applied to the propelling fluid at the entry of the duct depends on the full length of the duct. For very long distances (several kilometers), the required entry pressure of propelling fluid (liquid) might be of tens or of hundreds of bar. Such values become an issue, as the elongated element cannot be pushed into the pressure chamber without buckling.

The present invention aims to address the above mentioned drawbacks of the prior art, and to propose first a method for laying an elongated element into a submarine duct, which allows to operate in simple manner variety of sizes of elongated element into a variety of conditions.

In this aim, a first aspect of the invention is a method for installing an elongated element, such as a cable or a fibre, in a submarine duct, the submarine duct having an entry port located at or above a surface level or at a first depth in an outer liquid and an exit port located in the outer liquid at a second depth, the method comprising the steps of:
  introducing the elongated element into the entry port,
  introducing propelling liquid into the entry port of the duct,
characterized in that the method comprises a step of sucking propelling liquid out of the exit port of the duct with an immerged suction pump immerged in vicinity of exit port, presenting an inlet connected to the exit port and an outlet, the immerged suction pump being operated at a predetermined suction pressure drop of propelling liquid between the immerged suction pump inlet and the immerged suction pump outlet so that the predetermined suction pressure drop applied to propelling liquid is smaller than a hydrostatic pressure outside the duct at the location of the immerged suction pump. According to the above embodiment, a suction pump is installed at the exit port location, and connected to the exit port. Then, the pump is operated to suck the propelling liquid out of the duct, applying a pressure drop to the propelling liquid. The installation is now possible even for great lengths, as the pressure drop is applied at the exit port, so that the elongated element can be easily introduced into the entry port. One should note that the pressure chamber is not mandatory anymore: one can directly introduce the elongated element into the duct, as the propelling liquid can be introduced at no entry pressure. It should be noticed that the predetermined suction pressure drop applied to propelling liquid created by the suction pump is smaller than a hydrostatic pressure at the exit port: the pressure, in dynamic conditions, inside the duct is always positive, avoiding generation of bubbles or voids.

According to one aspect, the entry port might be located at a higher position/altitude than the exit port. In other words, the entry port might be at the surface level, a bit higher or even under the surface. It has to be noted that the method is not limited to the above, and the entry port might be located at a deeper depth than the exit port.

Advantageously, the predetermined suction pressure drop applied to propelling liquid is greater than 5 bar, preferably greater than 70% and more preferably greater than preferably 80% and even more preferably 90% of the hydrostatic pressure at the location of the exit port and/or immerged suction pump.

Advantageously, the entry port is connected to a pressure chamber, and:
  the elongated element is introduced into the entry port via the pressure chamber,
  the propelling liquid is introduced into the entry port via the pressure chamber at a predetermined entry pressure which is set to never exceed a threshold pressure. According to the above embodiment, propelling liquid is introduced under pressure, so that the installation length can be increased.

Advantageously, the predetermined suction pressure drop applied by the immerged suction pump to propelling liquid is smaller than the hydrostatic pressure at the location of the immerged suction pump. The pressure inside the duct is always positive, so that cavitation, bubbles or voids are not generated.

Advantageously, the threshold entry pressure is set to be lower than 30 bar, and preferably lower than 20 bar. The elongated element can be easily introduced into the duct at these pressures with a pushing unit comprising caterpillars for example, as the contra pressure force applied to the elongated element will not exceed pushing force achieved by caterpillar pushing unit.

Advantageously, the threshold entry pressure is set to be lower than 20%, and preferably lower than 10%, of the predetermined suction pressure drop applied to the propelling liquid by the immerged suction pump. Again, the elongated element can be easily introduced into the duct at these pressures with a pushing unit comprising caterpillars for example, as the contra pressure force applied to the elongated element will not exceed pushing force achieved by caterpillar pushing unit.

However, the method is not limited to the two above embodiments, and entry pressures of higher range might be held as well, up to 100 bar for example. In the later case the reel with elongated element might also be placed inside a pressure tank, in pressure communication with the pressure chamber.

Advantageously, the elongated element is pulled into the pressure chamber with pulling means arranged inside the pressure chamber.

Advantageously, the elongated element is pushed into the pressure chamber with pushing means arranged outside of the pressure chamber.

Advantageously, the elongated element presents a cross section area and is pushed or pulled into the pressure chamber at a given pushing or pulling force, and wherein the predetermined entry pressure is set to be equal to or lower than the pushing or pulling force divided by the cross section area.

Advantageously, the elongated element is freely inserted into the entry port, that is to say without pushing unit or pulling unit (caterpillars). The installation equipment is very simple and does not require any pressure chamber and not any sophisticated driving unit for driving the elongated element into the duct.

Advantageously, the elongated element is inserted into the entry port via a supply tube, the supply tube having an input and an output, the output of the supply tube being in connection with the entry port of the duct, a given fluid under pressure being fed near the input of the supply tube, and the elongated element being conducted into the input of the supply tube and being propelled through the supply tube by the entraining force of the given fluid, at least part of the given fluid being discharged from the supply tube at the output of the supply tube and, at the entry port of the duct, the propelling liquid being fed. Due to said measures, the pressure drop at the input of the tubular section (supply tube+duct) may be overcome without utilizing mechanical means which might damage the elongated element.

Advantageously, the method comprises the steps of:
providing a coupler in vicinity of the exit port at the given depth, the coupler being connected to a pulling rope,
coupling the coupler to a foremost end of elongated element arriving at the exit port,
puling the foremost end to the surface level. According to the above embodiment, while continuing the operation of the suction pump and the insertion of the elongated element and the propelling liquid at the entry port, the elongated element is pulled up to the surface after being fully installed into the submarine duct. The coupler can be a connecting pig.

Advantageously, the method comprises an initial step of providing a T junction at the exit port, so as to:
couple the exit port to a first branch of the T junction,
couple a second branch of the T junction aligned with the first branch to a riser duct containing the coupler and the pulling rope,
couple the immerged suction pump inlet to a third branch of the T junction. The T junction allows the immerged suction pump to continue sucking propelling liquid, during all the pulling up of the elongated element to the surface.

Alternatively to coupling the elongated element arriving to the exit port for pulling its foremost end to the surface level, the method comprises a preparation phase, executed before introducing the elongated element into the duct, comprising the step of coupling the elongated element to a precursor line selected to have at least similar density to that of propelling liquid and/or greater flexibility to that of the elongated element, wherein the exit port of the duct is connected via a T-junction to a riser duct leading near or to the surface, so that the method comprises the step of introducing the precursor line into the duct before installing the elongated element, and the step of leading a foremost end of the precursor line to or through an exit of the riser duct simultaneously to, or preferably before, the foremost end of the elongated element arrives to the exit port of the duct.

Advantageously, the method ends with the step consisting in lifting up the elongated element to the exit of the riser duct by pulling the precursor line.

Advantageously, the coupling of the precursor line to the elongated element is executed before introduction of the precursor line into the duct.

Alternatively, the coupling of the precursor line to the elongated element is executed after a significant part of the precursor line (at least 80%, preferably at least 90%, and more preferably all length but 10 meters) has been introduced into the duct.

Advantageously, the predetermined suction pressure drop is set so as to define a propelling liquid level in the riser duct to be located strictly above the pump, by a distance of e.g. 10 m or more.

Advantageously, the exit port is located at a depth greater than 100 m, preferably greater than 200 m, and more preferably greater than 1000 m.

Advantageously, the duct presents a length greater than 1 km, preferably greater than 10 km, and more preferably greater than 20 km.

It is to be understood that all the above technical features can be combined together or dissociated from each other, provided there is no technical contradiction.

Other features and advantages of the present invention will appear more clearly from the following detailed description of particular non-limitative examples of the invention, illustrated by the appended drawings where:

Figure 1:
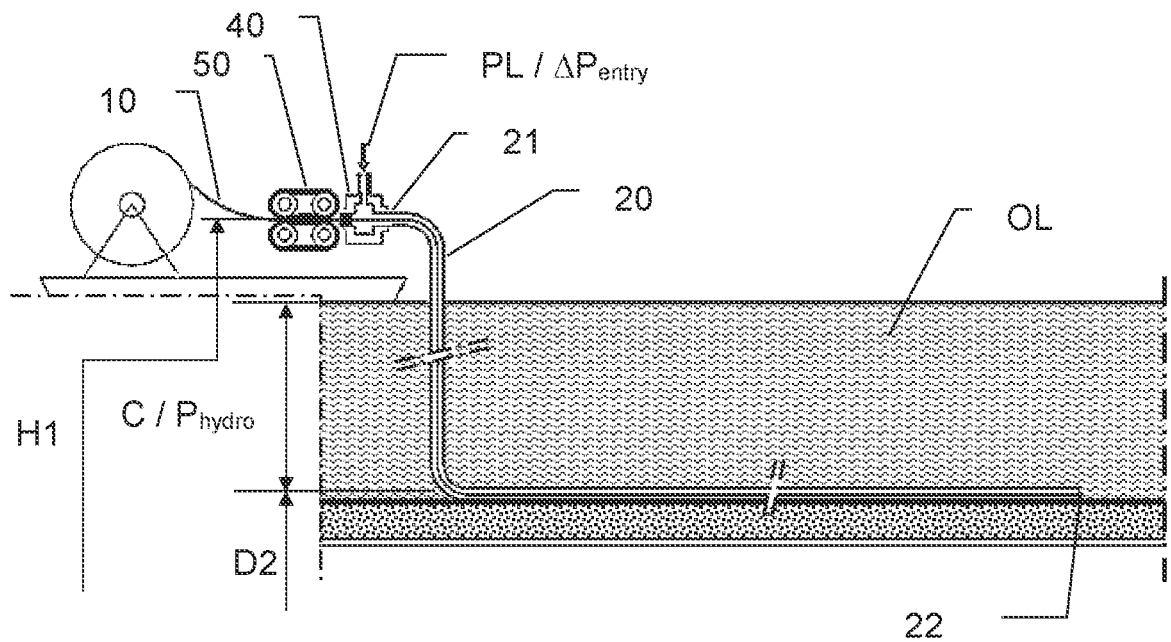
FIG. 1 represents a sketch of laying an elongated element into a submarine duct, according to the prior art.

In FIG. 1 a schematic representation is given of the prior art to install an elongated element 10 by floating into a duct 20 almost fully immersed in an outer liquid OL. As example a depth of 0.4 km and a total length of 2 km is given.

The duct 20 presents an entry port 21 connected to a pressure chamber 40, the elongated element 10 is pushed into the entry port 21 via the pressure chamber 40 with a pushing unit 50 (caterpillars). The entry port 21 in the example is located at altitude H1, but it could be located under the sea surface at a first depth. In case when the entry port 21 is located under the sea surface, it would be at a first depth, and reference H1 used for altitude would turn into reference D1 on the figures.

The duct 20 presents also an exit port 22, located well under the surface level, on the sea bed, at a second depth D2. In the given example, the exit port 22 is subjected to a hydrostatic pressure $P_{hydro}$ corresponding to the height of the outer liquid column C.

To insert the elongated element 10 into the duct 20, a propelling liquid PL is introduced at a pressure $\Delta P_{entry}$. In detail, as this entry pressure $\Delta P_{entry}$ is generated by a pump, it is a difference of pressure or a pressure drop.

Figure 2:
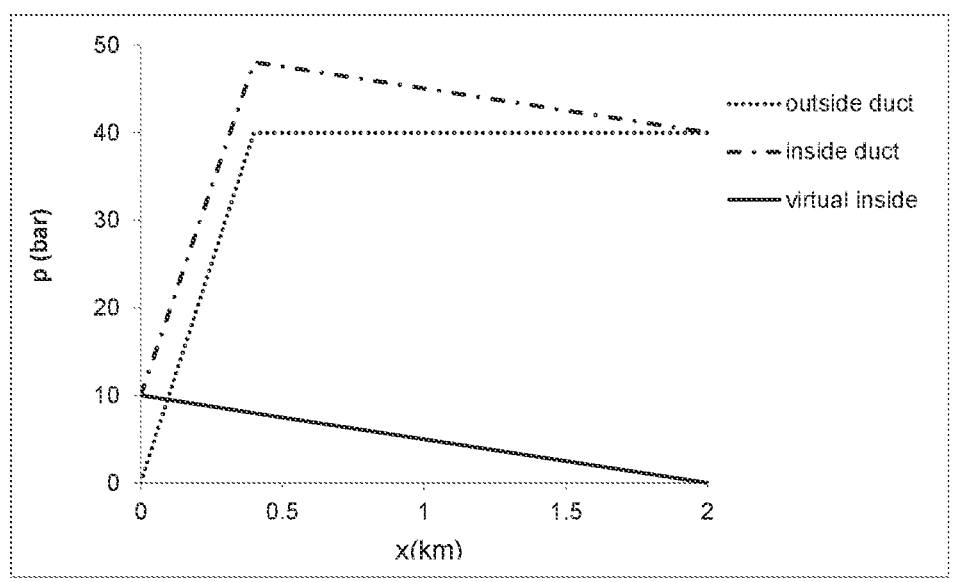
FIG. 2 represents a graph showing pressures involved in the case of FIG. 1.

As shown FIG. 2, the pressure outside the duct 20 increases linearly from 0 to 40 bar in the vertical part. Regarding the pressure inside the duct 20, at the entry port 21 the applied pressure $\Delta P_{entry}$ is 10 bar, also 10 bar higher than outside the duct 20 at the entry port 21, and at the end of the duct 20, inside pressure is equal to outside of the duct 20 (40 bar). The virtual pressure in the duct 20 (here also duct relative pressure) decreases linearly from 10 to 0 bar. The slope of the virtual pressure, which obeys Blasius' law for the turbulent flow, is a measure for the elongated element 10 drag force.

In order to insert the elongated element 10 into the pressure chamber 40 at 10 bar, the elongated element 10 must be pushed with a force at least equal to this pressure $\Delta P_{entry}$, multiplied by the cross-sectional area of the elongated element 10 (pushing the cork). For an elongated element 10 with e.g. a diameter of 30 mm this would require a pushing force of at least 707 N. This effort becomes a clearly limiting factor in case the depth and length are higher than in this given example. For example if depth and length are 10 times greater a pressure of 100 bar is needed, leading to 7069 N pushing force. Far more than machines for Floating and Blowing cables of this size usually give (they are usually rated to maximum 20 bar or less and a maximum pushing force of about 700 N). Increasing the pushing force can, in principle, be done by using a number of pushers in tandem, but this is limited by elongated element 10 buckling risk. This could, in principle, be avoided by placing the pushers inside the pressure chamber (so they pull instead of pushing, avoiding buckling). This would not only make the pressure chamber very long, there is still risk for buckling in the duct when the elongated element 10 installation is blocked while the propelling liquid pressure is released and the pushers still pushing. For installation of small elongated element 10 and optical fibres in small steel tubes this has been solved by placing the entire elongated element 10 reel inside a tank, at the same pressure as and in communication with the pressure chamber. For a 30 mm elongated element 10 of 20 km long, the 100 bar pressure tank would be enormous!

Figure 3:
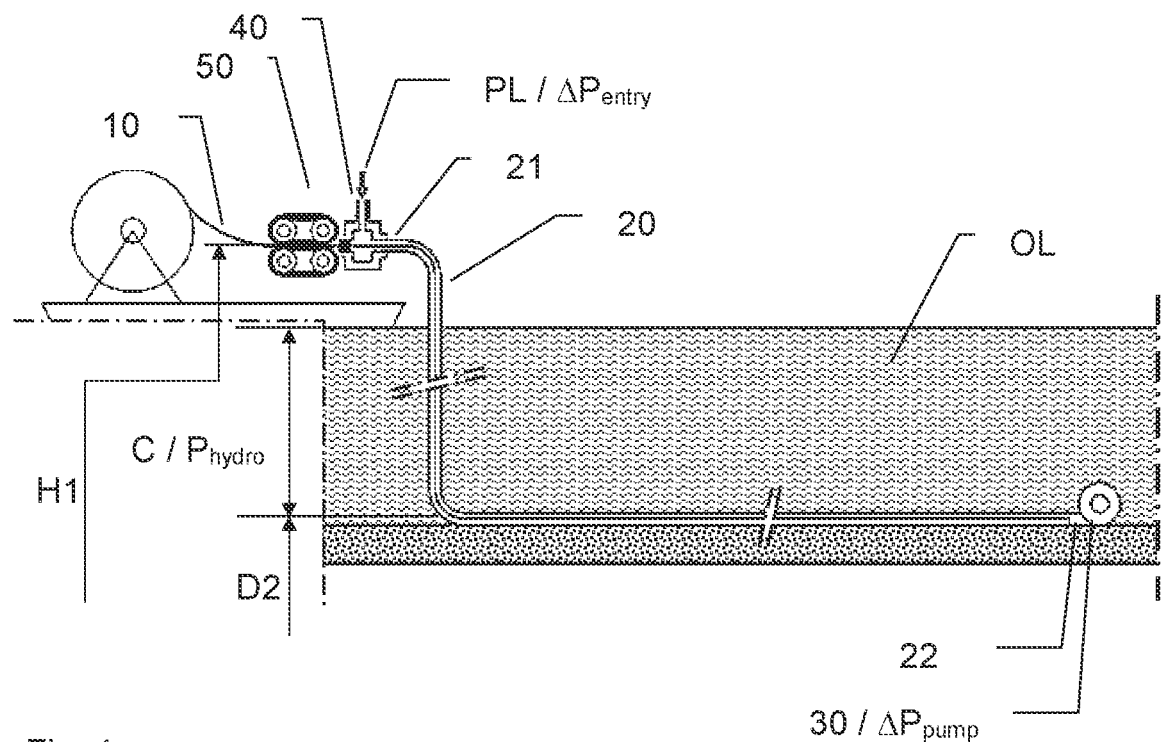
FIG. 3 represents a sketch of laying an elongated element into a submarine duct, according to the invention.
Figure 4:
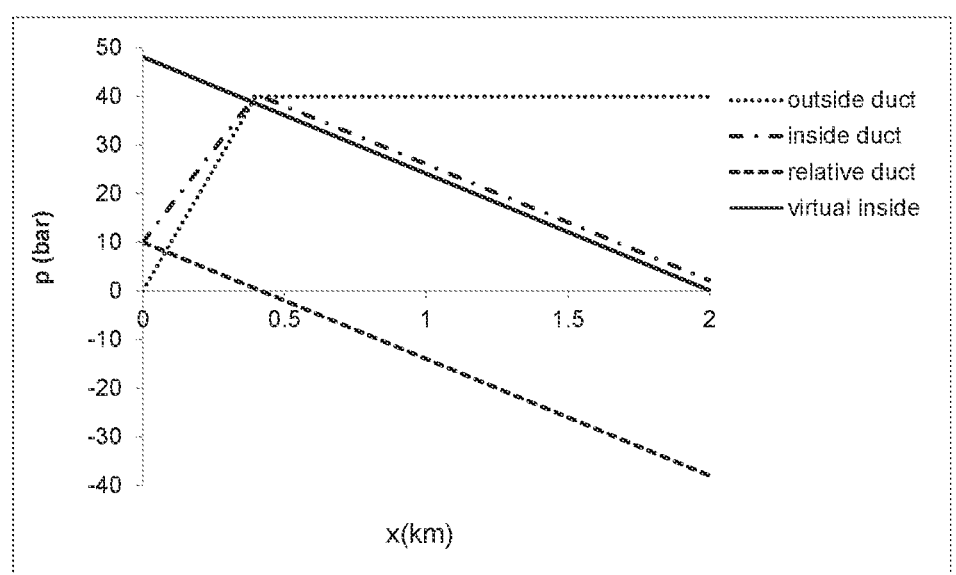
FIG. 4 represents a graph showing pressures involved in the case of FIG. 3.

To avoid the above drawbacks, and to allow installation in very long (more than 10 km, 20 km or even 40 km) and very deep ducts (4000 m depth) FIG. 3 illustrates a method according to the invention, involving placing an immerged suction pump 30 at the exit port 22 of the duct 20. This immerged suction pump 30 can have its outlet just in the surroundings of the exit port 22. Now the relative pressure over the duct 20 is negative for a part of the duct 20, see FIG. 4 (now also relative pressure shown), where the immerged suction pump 30 is operated at 38 bar. In this case 4.8 times larger virtual inside pressure gradient is obtained, resulting in a 4.8 times higher drag force on the elongated element, or about 4.8 times longer installation length. According to the invention, the immerged suction pump 30 is operated at the duct exit port 22 with a pressure drop (38 bar) below the hydrostatic pressure (40 bar) at the sea bed to avoid pumping too hard and/or creating vacuum sections without water in the duct 20. In particular, the immerged suction pump 30 applies to the propelling liquid a predetermined suction pressure drop $\Delta P_{pump}$, the outer liquid applies to the duct 20 a hydrostatic pressure $P_{hydro}$ generated by the outer liquid column C, for which the following relation shall apply:

$$P_{hydro} > \Delta P_{pump}$$

Figure 5:
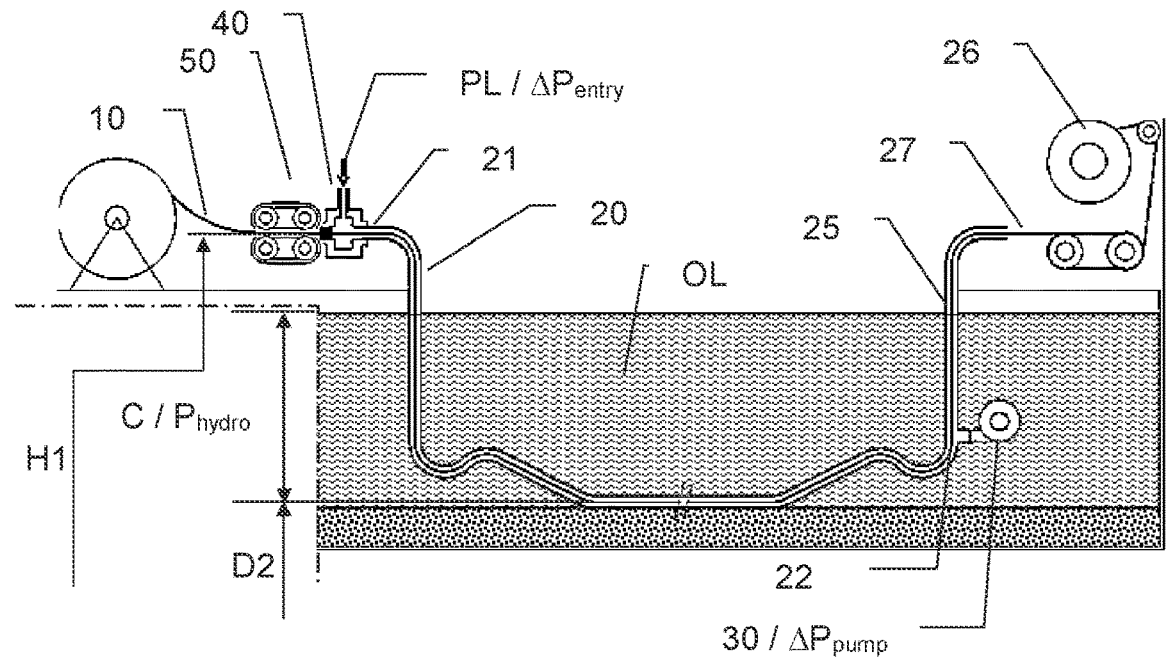
FIG. 5 represents a sketch of laying an elongated element into a submarine duct, according to an alternative embodiment of the invention.

Another example is described FIG. 5, where the elongated element 10 is pulled up to the surface after being installed into the duct 20. In this aim, the exit port 22 is connected to the immerged suction pump 30 and a riser duct 25 via a T junction, and a winch rope 27 pulled by a winch unit 26 are also provided.

In the given example of FIG. 5, the elongated element 10 is installed into a 16/13 mm microduct to be installed between two marine platforms distant by eight kilometers. According to regular floating technique, e.g. 40 bar of pressure for the propelling liquid at the pressure chamber 50 would be required. The sea in between the platforms is 200 m deep. As an example for the microduct (the duct 20 of FIG. 5), a standard dimension ratio SDR 11 microduct can be subjected without implosion risk to a short time outer pressure of 17.5 bar (at 25° C., much more at deep sea temperature of e.g. 4° C.). The immerged suction pump 30 is at a depth of 185 m (18.5 bar hydrostatic pressure) and connected by a T-junction at the exit port 22 (already or almost already in the vertical riser 25) at the vertical of the second (arrival) platform. Pumping is limited to apply a predetermined suction pressure drop at the immerged suction pump 30 $\Delta P_{pump}$ of 17.5 bar (to avoid implosion of the microduct), so also respecting the criteria:

$$P_{hydro} > \Delta P_{pump}$$

so vacuum and/or cavitation are avoided. At the injection side (entry port 21) the applied propelling liquid pressure $\Delta P_{entry}$ is 25 bar (relative inside pressure in a duct can be higher than relative outside pressure, 25 bar inside pressure no problem for SDR 11 microduct for short time), so the total applied pressure drop over the eight kilometers pipe is higher than the required forty bar to install the cable. When the elongated element 10 arrives at the immerged suction pump 30, it is picked up by the winch rope 27 to which it is hooked.

According to an aspect of the invention, the propelling liquid in the riser duct 25 is ten meters above the T-junction, the difference between the 185 m depth and the 175 m "equivalent hydrostatic depth" of the 17.5 bar pumping pressure $\Delta P_{pump}$. These ten meters is a safeguard that the propelling liquid pumping is not disturbed by air. So, the vertical 185 m the elongated element 10 has to be pulled up by the winch, of which 175 m are without buoyancy assistance. As this length is only short there will be no high forces involved. Optionally, as an extra safety against air (e.g. due to oscillations of the U-column of water), a receiving (bi-directional) pig might be placed, attached to the winch rope 27 and waiting for the elongated element 10 to hook on. In order to avoid high pull up forces this pig might have a valve that opens at low pressure.

In detail to ensure that the immerged suction pump 30 will always be immerged and will not suck air via the riser duct 25, the operation conditions are set as:

$$\Delta P_{pump} < P_{hydro} - 1 \text{ bar}$$

More preferably $$5 \text{ bar} < \Delta P_{pump} < P_{hydro} - 1 \text{ bar}$$

Figure 6:
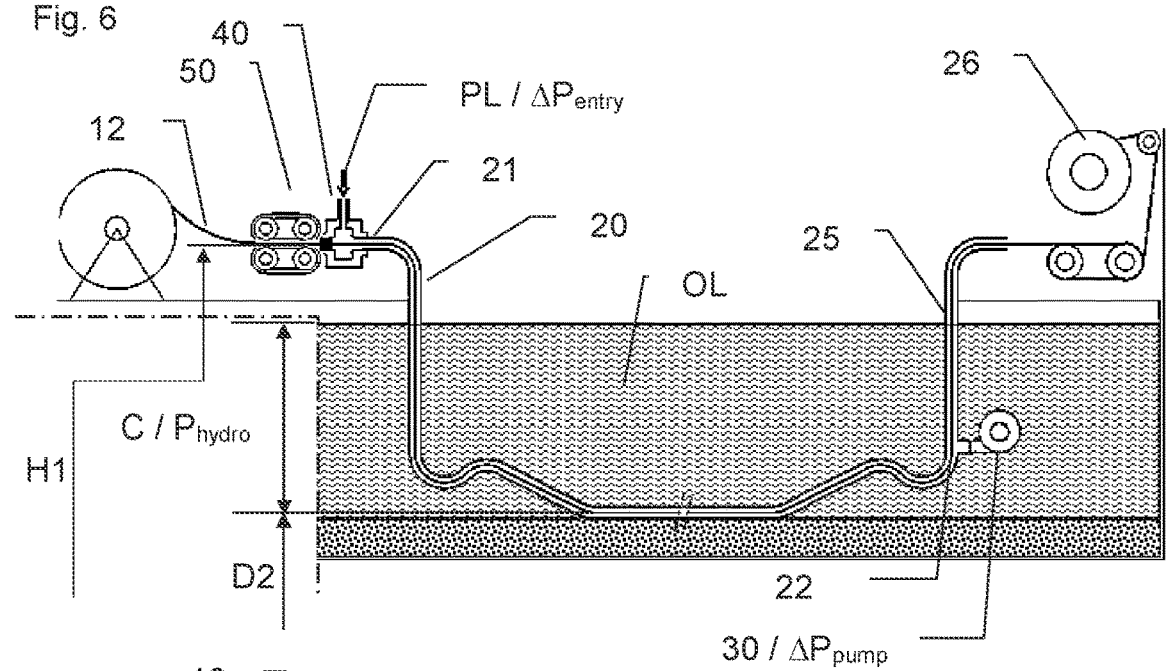
FIGS. 6 and 7 represent an alternative embodiment to the one depicted FIG. 5.
Figure 7:
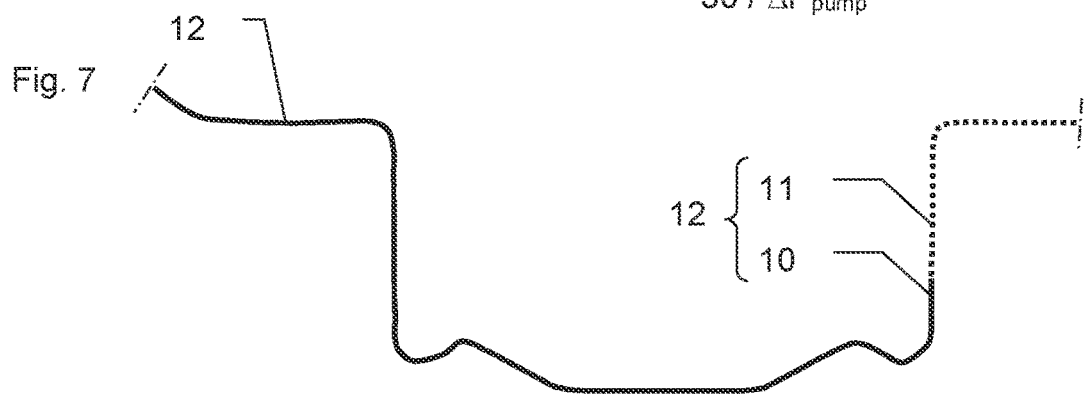

FIGS. 6 and 7 represent an alternative embodiment for pulling up the elongated element 10 back to the surface. In this embodiment, as show FIG. 7 representing the elongated element 10 without the environment of FIG. 6, the elongated element 10 is connected to a precursor line 11, to form a composite element 12. The precursor line 11 is chosen to have similar density to that of the propelling liquid PL (the densities could be equal at ±10%), and/or the precursor line 11 is chosen to have higher flexibility than the elongated element (flexibility could higher by at least 30%). Consequently, with reduced friction (because of neutral buoyancy provided by equal densities) and/or reduced capstan effect (provided by high flexibility), precursor line 11 is easily passed through the duct 20 and through riser duct 25 and their bends.

Length of precursor line 11 is chosen to be at least slightly greater than depth of exit port 22, so that the precursor line 11 will exit out of the riser duct 25 for providing a pulling line to pull the elongated element 10 up to the surface after the elongated element 10 has reached the exit port 22.

The main aspect of this embodiment is that the coupling of the elongated element 10 to the precursor line 11 is performed before the introduction of the elongated element into the duct 20. In other words, the coupling of the elongated element 10 to the precursor line 11 is performed at the surface level, which is an easy operation.

First option is to execute this coupling in vicinity to the installation equipment, preliminary or during installation operations. Second option is to execute this coupling far before installation, in a manufacturing factory for example.

One possibility is to introduce almost all the precursor line 11 into the duct (with same operating condition as the ones planed for the elongated element 10), then connecting the rear end of precursor line 11 to the foremost end of the elongated element 10, and then installing the elongated element 10 into the duct 20. Two reels will be necessary in this case.

Second possibility is to connect the precursor line 11 to the elongated element 10 before any installation, so that the composite element 12 will be provided already reeled on a single reel.

Reverting to the installation method, the precursor line 11 is first entered and laid into the duct 20, followed by the connected elongated element 10. Therefore, the precursor line 11 will be passed through the entire duct 20 and riser duct 25 before the foremost end of the elongated element 10 arrives at the exit port 22, with same or slightly adjusted operating conditions at least for pump 30, and/or pressure chamber 40. When the foremost end of the elongated element 10 arrives at the exit port 22, it is then possible to catch the precursor line 11 already arrived at surface level, to pull the rest of precursor line 11 and the elongated element 10 up to the surface as shown FIG. 6.

To assist travel of precursor line 11 through riser duct 25, it is possible to plan that a part of the pumping flow generated by the pump 30 has to be directed into the riser duct 25. Alternatively, a second pump (not shown) could be provided at the surface and a inlet hole could be provided in riser duct 25 at a given distance of exit port 22, so that the second pump could generate a flow of liquid into the riser duct 25 (different from the flow conditions applied into the duct 20). The rest of FIG. 6 is identical to FIG. 5 and will ne be described again here.

It is of course understood that obvious improvements and/or modifications for one skilled in the art may be implemented, still being under the scope of the invention as it is defined by the appended claims.

The invention claimed is:

1. Method for installing an elongated element, such as a cable or a fibre, in a submarine duct,
the submarine duct having an entry port located at or above a surface level or at a first depth in an outer liquid (OL) and an exit port located in the outer liquid (OL) at a second depth,
the method comprising the steps of:
introducing the elongated element into the entry port,
introducing propelling liquid (PL) into the entry port of the duct, characterized in that the method comprises a step of sucking propelling liquid (PL) out of the exit port of the duct with an immerged suction pump immerged in vicinity of exit port, presenting an inlet connected to the exit port and an outlet, the immerged suction pump being operated at a predetermined suction pressure drop ($\Delta P_{pump}$) of propelling liquid (PL) between the immerged suction pump inlet and the immerged suction pump outlet so that the predetermined suction pressure drop ($\Delta P_{pump}$) applied to propelling liquid (PL) is smaller than a hydrostatic pressure ($P_{hydro}$) of the outer liquid (OL) at the level of the second depth.

2. Method according to claim 1, wherein the predetermined suction pressure drop ($\Delta P_{pump}$) applied to propelling liquid (PL) is greater than 5 bar and preferably greater than 80% and more preferably 90% of the hydrostatic pressure ($P_{hydro}$).

3. Method according to claim 1, wherein the entry port is connected to a pressure chamber, and wherein:
the elongated element is introduced into the entry port via the pressure chamber,
the propelling liquid (PL) is introduced into the entry port via the pressure chamber at a predetermined pressure difference ($\Delta P_{entry}$) which is set to never exceed a threshold pressure difference.

4. Method according to claim 3, wherein the threshold pressure difference is set to be lower than 30 bar, and preferably lower than 20 bar.

5. Method according to claim 3, wherein the threshold pressure difference is set to be lower than 20%, and preferably lower than 10%, of the predetermined suction pressure drop ($\Delta P_{pump}$) applied to the propelling liquid (PL) by the immerged suction pump (30).

6. Method according to claim 3, wherein the elongated element is pulled into the pressure chamber with pulling means arranged inside the pressure chamber.

7. Method according to claim 6, wherein the elongated element presents a cross section area and is pulled into the pressure chamber at a given pulling force, and wherein the predetermined pressure ($\Delta P_{entry}$) is set to be equal to or lower than the pulling force divided by the cross section area.

8. Method according to claim 3, wherein the elongated element is pushed into the pressure chamber with pushing means arranged outside of the pressure chamber.

9. Method according to claim 8, wherein the elongated element presents a cross section area and is pushed into the pressure chamber at a given pushing force, and wherein the predetermined pressure ($\Delta P_{entry}$) is set to be equal to or lower than the pushing force divided by the cross section area.

10. Method according to claim 1, wherein the elongated element is freely inserted into the entry port.

11. Method according to claim 1, comprising the steps of:
providing a coupler in vicinity of the exit port at the given depth, the coupler being connected to a pulling rope,
coupling the coupler to a foremost end of elongated element arriving at the exit port,
pulling the foremost end to the surface level.

12. Method according to claim 11, comprising a initial step of providing a T junction at the exit port, so as to:
- couple the exit port to a first branch of the T junction,
- couple a second branch of the T junction aligned with the first branch to a riser duct containing the coupler and the pulling rope,
- couple the immerged suction pump inlet to a third branch of the T junction.

13. Method according to claim 12, wherein the predetermined suction pressure drop ($\Delta P_{pump}$) is set so as to define a propelling liquid (PL) level in the riser duct to be located strictly above the pump, by a distance of at least 10 m.

* * * * *